United States Patent [19]

Ebel

[11] 4,010,863
[45] Mar. 8, 1977

[54] COMBINED CONTAINER FOR NEW AND WASTE CRANKCASE OIL

[76] Inventor: Lawrence G. Ebel, 624 N. Pearl St., Albany, N.Y. 12204

[22] Filed: Feb. 9, 1976

[21] Appl. No.: 656,380

[52] U.S. Cl. .................... 220/1 C; 220/22; 220/20

[51] Int. Cl.² ............... B65D 85/00; B65D 25/40

[58] Field of Search ......... 220/20, 1 C, 20, 20.83, 220/22, 20.8

[56] References Cited

UNITED STATES PATENTS

| | | | |
|---|---|---|---|
| 1,554,589 | 9/1925 | Long | 220/1 C X |
| 1,966,022 | 7/1934 | Sumner | 220/20 |
| 2,172,836 | 9/1939 | Elsom | 220/20 |
| 3,154,219 | 10/1964 | Dean et al. | 220/20 |
| 3,453,665 | 7/1969 | Cokic et al. | 220/20 X |
| R27,449 | 8/1972 | Bartz | 220/1 C |

Primary Examiner—William Price
Assistant Examiner—Steven M. Pollard
Attorney, Agent, or Firm—Robert E. Heslin

[57] ABSTRACT

Discloses a container having a new crankcase oil compartment with a communicating spout for introduction therein and removal therefrom of new crankcase oil, and having a waste crankcase oil compartment with downwardly sloped portions of a drain funnel in common with a communicating screened opening for draining crankcase oil into the waste crankcase oil compartment. A communicating extension facilitates removal of waste crankcase oil from such compartment. Scales graduated in discrete units of liquid measure indicate the quantities of new and waste crankcase oil in their respective compartments.

1 Claim, 3 Drawing Figures

COMBINED CONTAINER FOR NEW AND WASTE CRANKCASE OIL

Projecting New York State's experience on a national scale, some 4 billion quarts of new crankcase oil are annually utilized by the public and of which some 2 billion quarts of waste crankcase oil are collectible from draining motor-vehicle crankcases. Such collectible waste crankcase oil can be recycled at refineries and profitably sold.

However, of the collectible and recyclable waste crankcase oil, at presently over half is dumped into the environment and some 15% thereof enters the waterways as harmful pollutants containing toxic substances, such as heavy metals, with such dumped waste crankcase oil contributing hazards not only to the environment but to human health.

Many retail service stations have waste oil storage tanks for crankcase oil drained from their customers' vehicles, and which waste oil in turn is collected and sent to refineries for recycling.

The problem is the do-it-yourselfers who drain and dump their vehicles' waste crankcase oil and some commercial users who drain and dump their vehicles' waste crankcase oil.

Accordingly, the object of this invention is to contribute to the solution of this discussed problem by providing a container having two compartments, one of which is a drain compartment into which waste crankcase oil can be drained and the other of which is a compartment for new crankcase oil to replace the waste oil drained from the crankcase. New crankcase oil purchased in bulk is cheaper than purchasing the same quantity in quart cans. It should further be appreciated that by use of the container of this invention, the do-it-yourselfer will be encouraged to purchase new crankcase oil in bulk and to return waste crankcase oil for collection.

Furthermore, the recommended refill capacities for crankcases vary from vehicle to vehicle, and not all crankcases take an even number of quarts respecting recommended refill. For example, if a do-it-yourselfer's vehicle has a recommended crankcase refill capacity of 4½ quarts, he will buy 5 quarts of oil with respect to which he does one of two things. He either refills his crankcase with 4½ quarts and saves ½ quart, or most likely refills his crankcase with 4½ quarts and dumps the excess ½ quart. Associated with the new oil compartment of this invention is a scale which allows the do-it-yourselfer to purchase in bulk quantity the exact quantity of new oil to refill his crankcase.

Accordingly, the object of the invention and other objects of the invention should be discerned and appreciated by reference to the detailed specification taken in conjunction with the drawings, wherein like reference numerals refer to similar parts throughout the several views, in which.

To facilitate the understanding of the invention, a nomenclature list is hereby provided:

| | |
|---|---|
| 1 | generally refers to the invention |
| 3 | flat side wall |
| 5 | flat side wall |
| 7 | flat end wall |
| 9 | flat end wall |
| 11 | flat bottom wall |
| 13 | flat internal wall |
| 15 | generally refers to drain funnel |
| 17 | sloped triangular portion |
| 19 | sloped triangular portion |
| 21 | sloped triangular portion |
| 23 | sloped triangular portion |
| 25 | internally threaded, depending opening |
| 27 | waste oil compartment |
| 29 | drain screen |
| 31 | threaded plug |
| 33 | internally threaded, tubular extension |
| 35 | threaded plug |
| 37 | new oil compartment |
| 39 | externally threaded oil spout |
| 41 | end cap |
| 43 | U-shaped handle |
| 45 | waste-oil scale |
| 47 | new-oil scale |

Figure 1:
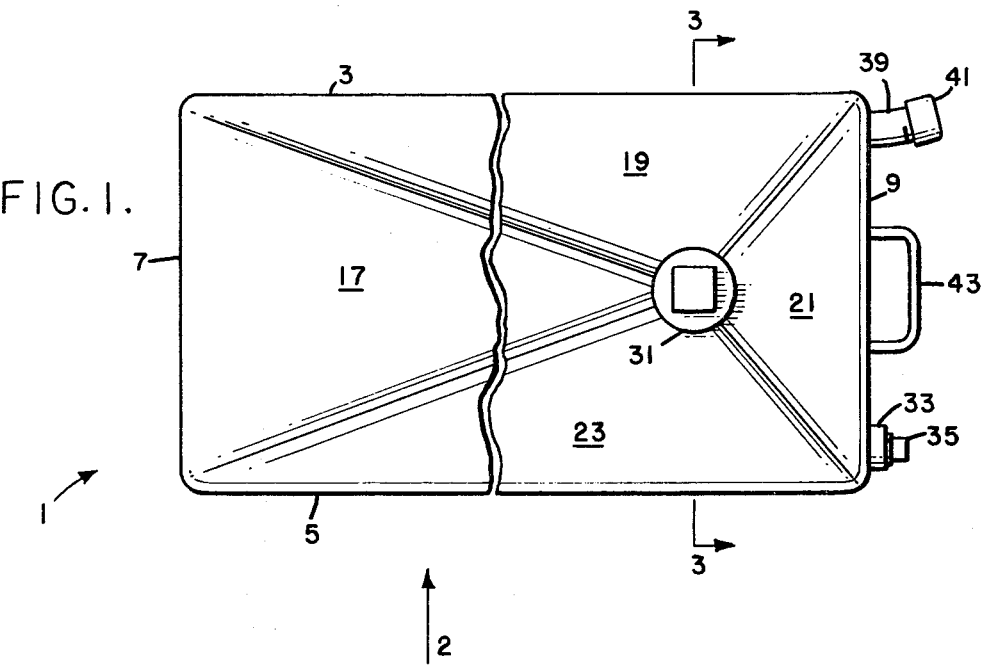
FIG. 1 is a top view of the invention.
Figure 2:
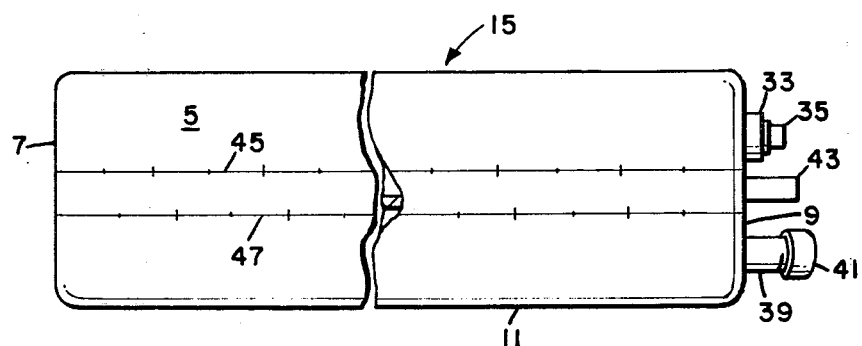
FIG. 2 is a view taken in the direction of the arrow 2 in FIG. 1.
Figure 3:
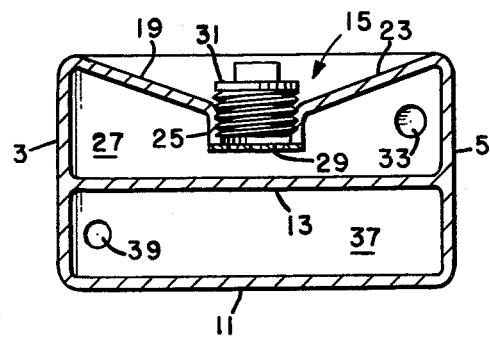
FIG. 3 is a sectional view taken in the direction of the arrows 3 — 3 in FIG. 1.

In FIG. 1 of the drawings, reference numeral 1 generally refers to the invention comprising the rectangular box-shaped, two-compartment container of suitable material, such as plastic, and of integral one-piece construction.

Container 1 has flat side walls 3 and 5, flat end walls 7 and 9, flat bottom wall 11, flat internal wall 13, and a drain funnel generally indicated by reference numeral 15 of downwardly sloped, triangularly shaped portions 17, 19, 21 and 23 having in common an eccentically disposed, internally threaded, depending opening 25 which communicates with waste oil compartment 27 defined by flat side walls 3 and 5, flat end walls 7 and 9, flat internal wall 13 and drain funnel 15. Suitably mounted and carried on the terminal end of depending opening 25 is drain screen 29. Threaded plug 31 is shown engaged with opening 25. Integrally formed with and projecting from end wall 9 is an internally threaded, tubular extension 33. Threaded plug 35 is shown engaged with extension 33.

New oil compartment 37 is defined by flat side walls 3 and 5, flat end walls 7 and 9, flat bottom wall 11 and flat internal wall 13. Integrally formed with and projecting from end wall 9 is an externally threaded oil spout 39. Internally threaded end cap 41 is shown engaged with oil spout 39.

Integrally formed with the bight portion of end wall 9 is a U-shaped handle 43. Integrally formed on side wall 5 are scales 45 and 47 graduated in discrete units of liquid measure to indicate the quantity of waste oil in compartment 27 and new oil in compartment 37, respectively, when container is appropriately disposed such that its wall 7 rests on a flat surface.

In using the container 1 in connection with a vehicle oil-change, end cap 41 is appropriately removed from oil spout 39, a discrete quantity of new oil corresponding to the recommended crankcase refill capacity is introduced through spout 39 into new oil compartment 37 and end cap 41 is replaced on spout 39.

Plug 31 is appropriately removed from opening 25, container 1 is appropriately disposed beneath the vehicle's oil pan such that bottom wall 11 will lie on the ground and such that when the drain plug is removed from the oil pan the old crankcase oil will drain upon drain funnel 15 and by gravity flow will flow to and through opening 25 into waste oil compartment 27, the drain plug is appropriately removed from the vehicle's oil pan and the old crankcase oil is allowed to drain upon funnel 15, flow to and through opening 25 into waste oil compartment 27, plug 31 is then appropriately replaced in opening 25, the drain plug is appropriately replaced in the vehicle's oil pan, and container 1 is removed from beneath the vehicle by appropriate manipulation of handle 43. Drain screen 29 prevents an inadvertently dropped oil-pan drain plug from being lost within waste oil compartment 27.

Next the vehicle's oil-filler cap is appropriately removed, the end cap 41 is appropriately removed from spout 39, the container 1 with its spout 39 is appropriately disposed to project spout into the opening resulting from the removal of the vehicle's oil-filler cap, all the new oil is allowed to flow from new oil compartment 37 through spout 39 into the crankcase after which spout 39 is removed and its end cap 41 replaced, and the vehicle's oil-filler cap is replaced.

Thereafter, container 1 may be taken to a waste oil collecting facility. The waste oil is removed from waste oil compartment 27 by removal of plug 35 from tubular extension 33, appropriately disposing container to allow the waste oil to flow from waste oil compartment 27 through tubular extension 33, and thereafter replacing plug 35. In this operation, plug 31 can be loosened sufficiently to effect thereby an air inlet vent to facilitate flow of the waste oil from waste oil compartment 27 through tubular extension 33.

Preparatory for a new oil change, new oil can be reintroduced into new oil compartment 37, as heretofore described.

Having thusly described my invention, I claim:

1. A combined double-compartment container and drain funnel for use in changing the crankcase oil for an engine comprising:
   a bottom wall;
   upstanding end walls and side walls connected to said bottom wall and being relatively short in comparison with the length and width of said bottom wall;
   a drain funnel connected to the top of said end walls and side walls;
   an internal wall connected to said end walls and side walls in a plane generally parallel to the bottom wall and spaced apart from the bottom wall and from said drain funnel so as to divide said container into a new oil compartment on the bottom and a used oil compartment on the top;
   a closable opening in the bottom of said drain funnel communicating with said used oil compartment;
   a closable pouring spout formed on an end wall and communicating with the new oil compartment, said spout being adapted for use with the oil filler opening of an engine; and
   a closable extension formed on the same end wall in communication with the used oil compartments;
   thereby providing a combined double-compartment container and drain funnel having an overall flat and broad configuration enabling it to be placed under an engine having relatively low clearance from the ground.

* * * * *